April 1, 1969   J. H. DUFF   3,436,260
METHOD FOR CLEANING FILTER BED FOR SUGAR LIQUOR
Filed Sept. 23, 1964
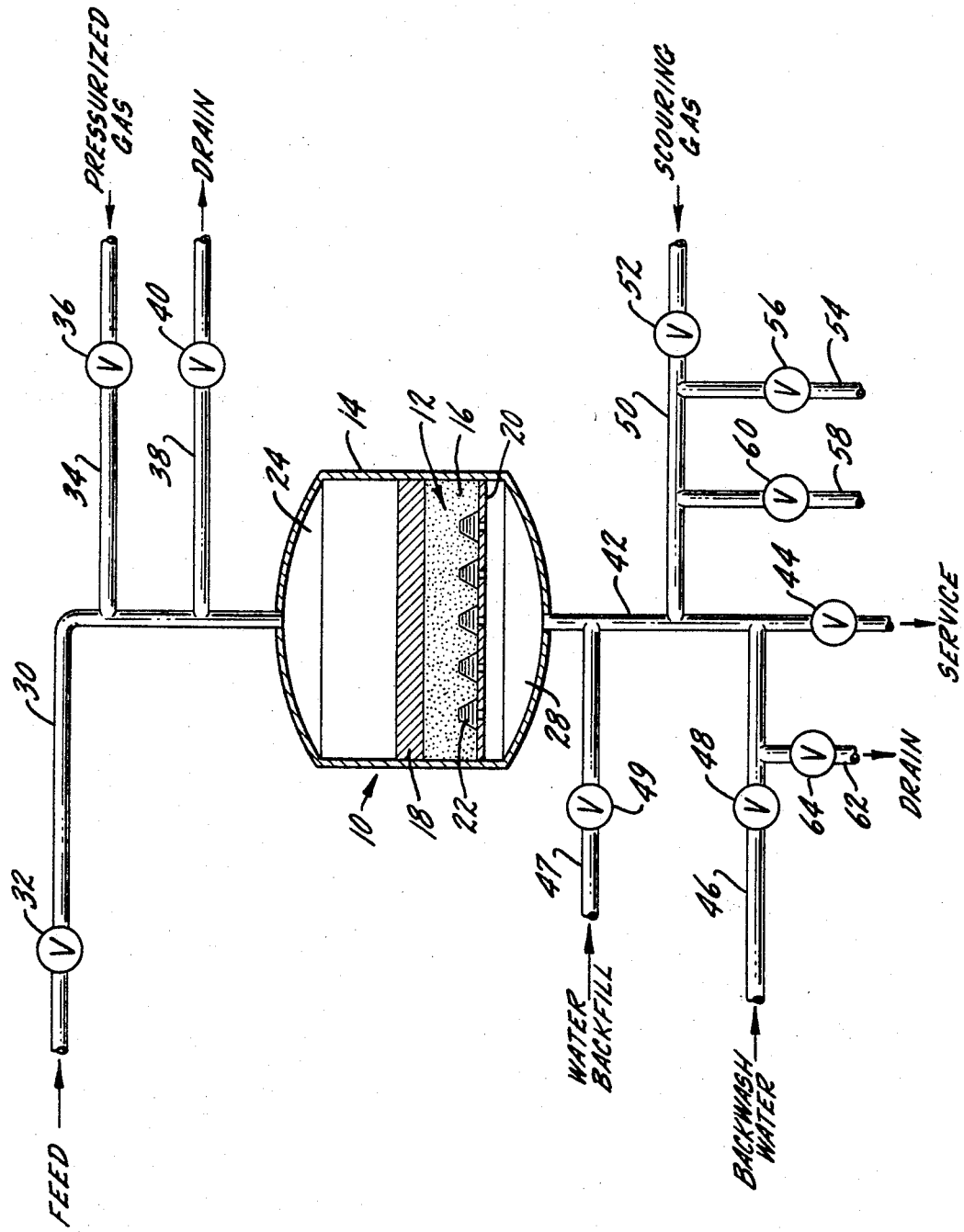
INVENTOR.
Joseph H. Duff,
BY
Hume, Groen, Clement & Hume
Attorneys.

United States Patent Office 3,436,260
Patented Apr. 1, 1969

3,436,260
METHOD FOR CLEANING FILTER BED FOR SUGAR LIQUOR
Joseph H. Duff, Basking Ridge, N.J., assignor, by mesne assignments, to Union Tank Car Company, Chicago, Ill., a corporation of Delaware
Filed Sept. 23, 1964, Ser. No. 398,699
Int. Cl. C13d 3/12; B01d 23/24, 23/16
U.S. Cl. 127—55                                        4 Claims

ABSTRACT OF THE DISCLOSURE

A filter bed, preferably having a lower sand layer and an upper anthracite layer, is regenerated by stopping the flow of sugar liquor to the tank and first draining any remaining sugar liquor, preferably under pressurized gas to facilitate removal. The tank is then filled with water, which is preferably heated to a temperature of about 150–180° F. to immerse the filter bed in the water. This water is then also removed by draining, preferably under the influence of pressurized gas. The tank is then filled with backwashing water to a level sufficient to immerse the filter bed, and a scouring gas is passed upwardly through it to dislodge impurities. Backwash water is then passed upwardly through the filter bed to remove further impurities, and any backwash water remaining in the tank is drained prior to resuming the service cycle.

This invention relates to a filter and a method of filtering sugar liquors and, more particularly, to a method for cleaning a filter bed which has been used to filter sugar liquor.

In the cane sugar refining industry it is common practice to treat the sugar liquor in a flotation-type clarifier to remove color and odor bodies and fiberous impurities. The effluent sugar liquor is passed to a filter having filter elements precoated with diatomaceous earth or the like. This filter removes smaller suspended solids, such as calcium phosphate, bagacillo and the like. The effluent is passed to a char or activated carbon filter wherein color, taste and odor bodies, ash and the like are removed. The precoat-type filter is, however, expensive to operate. It is therefore desirable to provide a filter and filtering method to perform substantially the same functions at less expense. Furthermore, it is desirable to provide a method of cleaning a filter utilized to treat sugar liquor.

Accordingly, it is an object of the present invention to provide a filter for filtering a sugar liquor.

It is another object to provide a filter for filtering a cane sugar liquor effluent from a flotation-type clarifier.

It is a still other object to provide a method for filtering a sugar liquor.

It is a further object to provide a method for filtering a cane sugar liquor effluent from a flotation-type clarifier.

It is still a further object to provide a method of regenerating a filter used for filtering sugar liquor.

It is another object to provide a method of regenerating a filter used to filter a cane sugar liquor effluent from a flotation-type clarifier.

The invention both as to its organization and method of operation, taken with further objects and advantages thereof, will be understood by reference to the following description taken in conjunction with the accompanying drawing, in which the figure is a partially diagrammatic, partially cross-sectional view of a filter embodying the features of the present invention.

Referring now to the drawing there is illustrated a filter embodying the features of the present invention and indicated generally by reference numeral 10. The filter 10 has a filter bed 12 of filter media through which the sugar liquor is passed during the service or filtering cycle to remove undesirable suspended solids, such as calcium phosphate, bagacillo and the like. The filtered sugar liquor from the filter 10 is passed to service, which is, in this instance, to a char or activated carbon filter not shown. After the filter bed 12 has become clogged with solids removed from the sugar liquor, the service cycle is terminated. In accordance with the method of the present invention, any sugar liquor remaining in the filter is forced by pressurized gas out of the filter and recycled to an upstream step in the sugar refining process. Water is then passed into the filter 10 to completely immerse the filter bed 12 in water. This water is forced out of the filter 10 with pressurized gas and also recycled to an upstream step in the sugar refining process. The filter 10 then has additional water added thereto and the filter bed 12 is sequentially gas scoured and backwashed. The backwash water is drained from the filter and the filter 10 is ready to renew the service cycle.

More specifically, the filter 10 comprises a closed cylindrical tank 14. The filter bed 12 comprises a lower layer 16 of sand having a depth in the range of about 6 to 24 inches and an upper layer 18 of anthracite having a depth in the range of about 6 to 24 inches. The filter bed 12 is situated in the tank 14 on a false bottom member 20 having strainer means 22, as is well known in the art. In this manner an inlet compartment 24 and an underdrain compartment 28 are formed above and below, respectively, the filter bed 12 in the filter tank 14.

An inlet line 30 having a valve 32 is connected to the upper portion of the tank 14 and communicates with the inlet compartment 24. The inlet line 30 is connected to the source of feed, in this instance cane sugar liquor coming from the flotation-type clarifier (not shown), which is well known in the art.

Communicating with the inlet line 30 is a gas line 34 connected to a source of pressurized gas. The gas line 34 has a valve 36 therein which is normally closed. It is preferred to employ air though many other gases which are substantially inert with respect to the sugar liquor and filter media may be employed. If air is employed, the source thereof may be an air blower. The particular air blower selected would be within the ordinary skill of one in the art. Furthermore, the line 34 may be connected to the plant's pressurized air line. Any other means may be employed which provides pressurized gas of the type which does not detrimentally affect the sugar liquor or the filter media. The pressure of the gas may be varied depending generally upon where the sugar liquor removed from the filter 10 is to be delivered.

Also communicating with the inlet line 30 and therefore the inlet chamber 24 is a backwash outlet line 38 leading to a drain (not shown). The backwash outlet line 38 has a valve 40 therein which is closed except during the gas scouring and backwash cycle.

A service line 42 is connected to the filter 10 and communicates with the underdrain compartment 28. A valve 44 in the line 42 is open during the service cycle. Connected to the service line 42 is a backwash inlet line 46 having a valve 48 therein. A water backfill line 47 having a valve 49 is connected to the service line 42. The water backfill line 47 is connected to a suitable source of water (not shown), preferably having water at a temperature in the range of about 150 to 180° F. Also connected to the service line 42 is a scouring gas line 50 communicating with a source of scouring gas (not shown) and having a valve 52 therein. The scouring gas may be air and the source of scouring gas may therefore be an air blower. The particular type of gas or air blower utilized is a matter of choice within the ordinary skill of one in the art. Connected to the scouring gas line 50 is a turbid juice line 54 having a valve 56 therein and a sweet water line 58 having a valve 60 therein.

Considering the operation of the filter 10 in more detail, during the filtering or service cycle of the filter 10 the valves 32 and 44 are open and all other valves are closed. In this manner the cane sugar liquor from the flotation-type clarifier passes through the line 30 into the inlet compartment 24, through the filter bed 12, into the underdrain compartment 28, and into the service line 42 where it passes to a char or activated carbon filter or the like (not shown). The filter bed 12 removes suspended solids from the sugar liquor, such as calcium phosphate, bagacillo and the like. During the service cycle, the collection of these suspended solids in the filter bed 12 will increase the pressure drop across the filter bed 12 to a point where further operation of the filter 10 becomes uneconomical. The service cycle is then terminated manually or automatically with control means as will be apparent to one with ordinary skill in the art. In any event, the service cycle is terminated by closing the valve 32 and then the valve 44.

Upon termination of the service cycle the filter 10 remains substantially full of sugar liquor. This sugar liquor is expelled from the filter 10 by opening the valve 36 in the gas line 34 and the valve 56 in the turbid juice line 54. In this manner pressurized gas, in this instance air, enters the top of the filter 10 through lines 34 and 30 and forces the remaining sugar liquor out of the filter 10 through the line 42 and into lines 50 and 54. The turbid juice is passed through the line 54 and recycled to an upstream step in the sugar refining system, for example, it may be recycled to the flotation-type clarifier. The valve 36 and the valve 56 are closed after all of the sugar liquor has been expelled from the filter 10 by the pressurized air.

Valve 49 is opened to permit water to flow through the lines 47 and 42 into the underdrain compartment and fill the tank 14 until the filter bed 12 is completely immersed in water. The backfill water dissolves any sugar liquor that may adhere to the filter bed 12. Preferably hot water in the temperature range of about 150 to 180° F. is employed. The filter bed is allowed to soak in the water for a sufficient period of time to dissolve a maximum amount of any residual sugar liquor left on the filter bed 12. The valves 36 and 60 are then opened whereby pressurized air passes into the inlet compartment 24 of the filter 10 through lines 34 and 40 and thereby expels the water out of the filter 10. The water leaves the filter 10 through the underdrain compartment 28, the lines 42, 50 and 58. This sweet water is recycled to an upstream step in the sugar refining system, for example, to the flotation-type clarifier. After all of the sweet water has been removed from the filter 10 the valves 36 and 60 are closed. This step may be repeated as many times as necessary to remove the residual sugar liquor from the bed 12.

The valve 48 is opened to permit backwash water to pass through line 46 into the line 42 and the underdrain compartment 28 of the filter tank 14. The valve 40 is also opened. Sufficient backwash water is added to the filter 10 to immerse the filter bed 12 in backwash water. It is desirable to maintain an air space above the backwash water in the inlet compartment 24 for reasons more apparent hereinafter. Once sufficient backwash water has been added to the filter 10 the valve 48 is closed and the filter is ready for the gas scouring cycle.

During the gas scouring cycle the valves 52 and 40 are opened. When the valve 52 is opened a gas, in this instance air from an air blower (not shown), passes into the underdrain compartment 28 and rapidly up through the filter media in the filter bed 12. The air entering the underdrain compartment 28 and passing up through the filter bed 12 travels at a relatively high velocity. The air agitates the filter bed 12 and causes the foreign particles which have collected therein to become disengaged from the filter media. As the air passes through the filter bed 12 filter media may become entrained in the air. However, the filter media will disengage from the air when the air enters the air space in the upper part of the inlet compartment 24. In this air space the filter media entrained with the scouring air will drop back in the liquid in the filter chamber 24. For this reason it is preferred to maintain an air space above the backwash water that was added to the filter 10 prior to the gas scouring cycle. After a predetermined period of time, generally in the range of about 5 to 10 minutes, the gas scouring cycle is terminated by closing the valve 52.

The backwash cycle is then initiated by opening up the valve 48 whereby backwash water from a suitable source is passed upwardly through the filter bed 12 into the line 30 and to drain through the backwash outlet line 38, since the valve 40 is left open. The backwash cycle removes all of the foreign impurities which were dislodged from the filter media during the gas scouring cycle. After the backwash cycle has been completed the flow of backwash water to the filter 10 is terminated by closing the valve 48. Any backwash water remaining in the filter 10 is passed to drain through the line 62 by opening the valve 64. After the filter 10 has been drained the valve 64 is closed and the filter 10 is ready to begin the service cycle again.

If desired the gas line 34 may serve as a vent line to the atmosphere. In this instance, instead of forcing the sugar liquor remaining in the filter 10 after the service cycle and the sweet water out of the filter 10 with pressurized air, these fluids are expelled from the filter by gravity. Venting the line 34 to atmosphere would be used, for example, where the sweet water and turbid juice is to be delivered to some point at a lower level than the filter 10. In such instances pressurized air is not necessary to force the sweet water and turbid juice out of the filter 10 and to the desired destination for recycling.

The various valves illustrated and discussed herein will be understood to be valves well known in the art. The particular valves used would, of course, be a matter of choice within the ordinary skill of one in the art.

Although the present application has been discussed in detail with respect to treating a cane sugar liquor from a flotation-type clarifier in a sugar refining process, it will be understood that the method and filter of the present invention are equally applicable to any sugar liquor streams, including beet, corn and cane sugar liquor streams. For example, the method and filter of the present invention may be utilized on a sugar liquor coming from a gravity-type clarifier or from any other step in a sugar refining process wherein it is desirable to remove suspended solid material from the sugar liquor. It is, however, preferred to employ the method and filter of the present invention on cane sugar liquors coming from flotation-type clarifiers.

While the embodiment herein is at present considered to be preferred, it will be understood that various modifications and improvements may be made therein and it is intended to cover in the appended claims all such modifications and improvements as fall within the true spirit and scope of the invention.

What is claimed is:
1. A method of regenerating a filter bed having a lower layer of sand and an upper layer of anthracite in a filter tank used for filtering a sugar liquor in a sugar refining process which comprises terminating the flow of said sugar liquor to said filter tank, draining any remaining sugar liquor from said filter tank, passing water into said filter tank to immerse said filter bed in said water, draining said filter tank to remove said water from said filter tank, adding sufficient backwash water to said filter tank to immerse said filter bed in backwash water, passing scouring air into said filter tank and upwardly through said filter bed to dislodge impurities filtered by said filter bed from said sugar liquor, passing backwash water upwardly through said filter bed and out of said filter tank to remove said impurities from said filter bed and draining any backwash water from said filter tank prior to beginning the service cycle again.

2. The method of claim 1 wherein said sugar liquor and water drained from said filter tank are recycled to an upstream step in the sugar refining process.

3. A method of regenerating a filter bed having a lower layer of sand and an upper layer of anthracite in a filter used for filtering cane sugar liquor effluent from a flotation-type clarifier which comprises terminating the flow of said sugar liquor effluent to said filter, passing pressurized gas into an upper portion of said filter to remove sugar liquor effluent from said filter, passing backfill water into said filter tank to immerse said filter bed in said water, passing pressurized gas into an upper portion of said filter to force said backfill water from said filter, filling said filter with a backwash water sufficiently to immerse said filter bed in said backwash water, passing a scouring gas into said filter and upwardly through said filter bed to dislodge impurities filtered by said filter bed from said sugar liquor effluent, passing backwash water upwardly through said filter bed and out of said filter tank to remove said impurities from said filter bed and draining any backwash water remaining in said filter from said filter prior to beginning the service cycle.

4. The method of claim 3 wherein said backfill water has a temperature in the range of about 150 to 180° F.

References Cited

UNITED STATES PATENTS

| 455,574 | 7/1891 | McDonald | 210—79 |
| 2,156,291 | 5/1939 | Hurt | 210—79 X |
| 2,423,172 | 7/1947 | Booth | 210—82 |
| 3,078,188 | 2/1963 | Assalini | 127—55 |
| 1,802,726 | 3/1931 | Levine | 134—37 X |

FOREIGN PATENTS 897,789  4/1962  Great Britain.

OTHER REFERENCES

J. Sewage & Industrial Wastes, Rapid Filtration of Sewage effluents through Sand and Anthracite, July 24, 1952, p. 835–843.

MORRIS O. WOLK, *Primary Examiner.*

D. G. CONLIN, *Assistant Examiner.*

U.S. Cl. X.R.

127—53; 134—37; 210—80, 82